(12) United States Patent
Frank

(10) Patent No.: US 11,038,855 B2
(45) Date of Patent: Jun. 15, 2021

(54) ENCRYPTION FILTER

(71) Applicant: medisite GmbH, Hannover (DE)

(72) Inventor: Torsten Frank, Hannover (DE)

(73) Assignee: medisite GmbH, Hannover (DE)

( * ) Notice: Subject to any disclaimer, the term of this patent is extended or adjusted under 35 U.S.C. 154(b) by 618 days.

(21) Appl. No.: 15/738,977

(22) PCT Filed: Jun. 23, 2016

(86) PCT No.: PCT/EP2016/064546
§ 371 (c)(1),
(2) Date: Dec. 21, 2017

(87) PCT Pub. No.: WO2016/207282
PCT Pub. Date: Dec. 29, 2016

(65) Prior Publication Data
US 2018/0191692 A1    Jul. 5, 2018

(30) Foreign Application Priority Data
Jun. 24, 2015  (EP) .................................... 15173725

(51) Int. Cl.
*H04L 29/06* (2006.01)
*H04L 9/00* (2006.01)
(Continued)

(52) U.S. Cl.
CPC ........ *H04L 63/0471* (2013.01); *G06F 21/602* (2013.01); *H04L 9/008* (2013.01);
(Continued)

(58) Field of Classification Search
CPC . H04L 63/0471; H04L 9/008; H04L 63/0428; G06F 21/602
(Continued)

(56) References Cited

U.S. PATENT DOCUMENTS 6,941,459 B1 * 9/2005 Hind .................. G06Q 20/3829
713/167
6,975,727 B1 * 12/2005 Vandergeest .......... H04L 9/0891
380/273
(Continued)

FOREIGN PATENT DOCUMENTS

DE  102011118804 A1  2/2013

OTHER PUBLICATIONS

International Search Report issued for PCT/EP2016/064546 dated Sep. 15, 2016, 3 pages.
(Continued)

*Primary Examiner* — Yin Chen Shaw
*Assistant Examiner* — Angela R Holmes
(74) *Attorney, Agent, or Firm* — McDermott Will & Emery LLP

(57) ABSTRACT

The invention relates to a method and an apparatus for encrypted communication between a client and a server, wherein the communication comprises request messages, each with request elements, and response messages, each with response elements. Request elements and response elements can comprise data. It is an object of the invention to hamper or prevent unauthorized access to the data during communication and also during storage and processing on the server. In this case, it is assumed that the communication channel and also the server itself are not trustworthy and neither client nor server provide measures or are adaptable in order to counter said risks of unauthorized access, for example by means of cryptographic methods. The invention achieves this object by virtue of a first request message being received from a client, being broken down into request elements, and at least one request element being encrypted on the basis of a predetermined configuration, encrypted request elements being combined with unencrypted request
(Continued)

elements to form a second response message, and being finally transmitted to the server; a first response message is then received from the server, broken down into response elements, and at least one request element is encrypted on the basis of a predetermined configuration, the encrypted request element is combined with unencrypted request elements to form a second request message, and is finally transmitted to the server; a first response message is received from the server, broken down into response elements, response elements that need to be decrypted are determined and decrypted, decrypted response elements are combined with unaltered, unencrypted response elements to form a second response message, and are finally transmitted to the client. The invention also presents an apparatus for encrypting communication between the client and the server, wherein the apparatus is arranged between the client and the server and wherein the apparatus is set up to perform the steps of said method for encrypted communication between the client and the server.

16 Claims, 6 Drawing Sheets

(51) Int. Cl.
*H04L 9/08* (2006.01)
*G06F 21/60* (2013.01)
(52) U.S. Cl.
CPC .......... *H04L 9/088* (2013.01); *H04L 63/0428* (2013.01); *G06F 2221/2107* (2013.01); *G06F 2221/2125* (2013.01); *H04L 2209/76* (2013.01)

(58) Field of Classification Search
USPC .......................................................... 713/153
See application file for complete search history.

(56) References Cited

U.S. PATENT DOCUMENTS

| | | | | |
|---|---|---|---|---|
| 9,749,297 | B2* | 8/2017 | Gvili | H04L 63/10 |
| 2010/0145946 | A1* | 6/2010 | Conrad | G06F 16/2452 707/736 |
| 2012/0124369 | A1* | 5/2012 | Amenedo | H04L 63/062 713/156 |
| 2013/0036313 | A1 | 2/2013 | Schwenk et al. | |
| 2013/0042106 | A1* | 2/2013 | Persaud | H04L 63/104 713/165 |
| 2013/0219176 | A1 | 8/2013 | Akella et al. | |
| 2014/0122866 | A1 | 5/2014 | Haeger et al. | |
| 2014/0366155 | A1 | 12/2014 | Chang et al. | |

OTHER PUBLICATIONS

Popa et al., "CryptDB," Operating Systems Principles, ACM, Oct. 23, 2011, pp. 85-100.
Gentry, C. and Boneh, D. "A fully homomorphic encryption scheme" (vol. 20, No. 9, pp. 1-209). Stanford: Stanford University, 2009.
Paillier, P. "Public-key cryptosystems based on composite degree residuosity classes" in International conference on the theory and applications of cryptographic techniques, May 2, 1999 (pp. 223-238). Springer, Berlin, Heidelberg.
Popa, Raluca Ada, et al. "CryptDB: protecting confidentiality with encrypted query processing" in Proceedings of the Twenty-Third ACM Symposium on Operating Systems Principles, Oct. 23, 2011 (pp. 85-100).

* cited by examiner

ENCRYPTION FILTER

CROSS REFERENCE TO RELATED APPLICATIONS

This application is a U.S. National Stage of International Application No. PCT/EP2016/064546 filed on Jun. 23, 2016, which claims priority to European Application No. 15173725 filed on Jun. 24, 2015. The entire contents of these applications are incorporated herein by reference.

The invention relates to a method and a device for encrypted communication between a client and a server, wherein the communication comprises query messages containing query elements, and response messages containing response elements. Query elements and response elements may comprise data.

PRIOR ART

Methods and devices for encrypted communication between a client and a server are known from the prior art.

The themes, data protection and data security through encryption, are well known. There are many very different encryption methods, and concepts for using them, for protecting data.

The web service and XML specifications provide for message encryption or communication via secure connection protocols like SSL/TLS for encryption at the transmission level. REST itself does not define any encryption methods and normally relies on message encryption methods. These are exclusively for protecting the communication path between a client and a server. The data themselves are then decrypted at the server end and can thus be read there. This is also referred to in this context as point to point encryption of the communication. An attacker or administrator gains potential access therewith to unprotected data on the server.

Known methods in the field of encryption of structured data include, e.g., XML encryption, described under http://www.w3.org/TR/xmlencore/, and JSON web encryption, described under https://tools.ietf.org/html/draft-ietf-jose-json-web-encryption-39, for the respective encryption of data in the XML and JSON formats. These methods are also generally used for encrypting messages in an exchange between a client and server components, or for encrypting entire documents, or portions thereof. The encryption modifies the structure of the data, however, in that it also introduces tags or attributes, which is problematic for the use of the data in systems that are not configured for handling and processing encrypted data. The encryption is thus not transparent for the applications and services that process these data. Depending on which service is called on, if it is not configured for the processing of encrypted data, it may classify a message that has been structurally modified compared to the unencrypted message, due to the encryption, as invalid, because there are unknown tags or attributes therein. Moreover, the selected service may receive an indication of the encryption through these methods, which may also be undesirable in certain circumstances. In order to decrypt encrypted data, the key must be known, e.g. by the client.

A method is described in DE102011118804A1, "Persistente Verschlüsselung mit XML Encryption," ["Persistent Encryption with XML Encryption"] explaining how encryption takes place with XML and key data can be added to an XML document. The structure of the document is modified here as well, and additional data is transmitted that could provide a potential attacker with knowledge of the presence and type of encryption, thus giving the attacker an advantage.

A method is described in U.S. Pat. No. 6,941,459, "Selective data encryption using style sheet processing for decryption by a key recovery agent," for encrypting XML documents with style sheet processing. The encryption according to the method takes place in a manner that is transparent to the recipient on the basis of a predefined configuration, i.e. "policy" in English. This method, however, is based on data retrieval in the XML format. A user retrieves data from a system and receives a partially encrypted document that can only be decrypted by this user. Each time a document is retrieved, the configuration is checked and encrypted on the basis of the rules defined for the user. The data are not encrypted in the source system with this method.

Furthermore, technologies and concepts are known for storing encrypted data in a cloud. By way of example, eCryptFS, which is described under https://launchpad.net/ecryptfs, enables the encryption of data and drives that are stored in the cloud. PGP, described under http://www.pgpi.org, also offers similar possibilities for encrypting files and messages. These technologies and tools require, however, that the data source, i.e. the client, is specifically configured for data encryption and key management. These technologies cannot, however, be used, at least without additional effort and adaptation, for encrypting communication in general web-based applications.

US20140122866 describes the transparent encryption of files using a proxy. This technology has the disadvantage that only entire files are encrypted, and thus, partially unencrypted processing in the cloud is not possible. The method is configured for the use of encryption and storage in a cloud, and not for use with general web-based applications or web-services that communicate, by way of example, according to the REST scheme.

There are also numerous algorithms for data encryption. These algorithms differ in the fields of security, processing speed, and the possibility of executing operations on encrypted data that have the same effect on the decrypted form of the data, as is the case with homomorphic encryption. The RSA algorithm allows, for example, multiplication of encrypted numbers. A further example is the Paillier cryptosystem, which is an additive homomorphic cryptosystem, by means of which unknown plain text can be added through operations carried out on key text. The possibilities of homomorphic encryption have been described, for example, by Paillier in "Public-Key Cryptosystems Based on Composite Degree Residuosity Classes," Eurocrypt 99, Springer Publishing, 1999, pages 223-238. Most of the algorithms are partially homomorphic thereby, thus only supporting either multiplicative or additive operations.

A fully homomorphic encryption is possible with the encryption system proposed by Gentry in "A fully homomorphic encryption scheme," Stanford Crypto Group, Aug. 1, 2009, pages 169-178. One disadvantage with the currently known fully homomorphic algorithms, however, is that they require a great deal of computing, and the execution times of operations by factors of $10^{11}$ and $10^{12}$ are extended, and the application thereof for data of limited dimensions, or individual elements of a message that is to be communicated, is limited.

The CryptDB system described by Raluca et al., "CryptDB: Protecting Confidentiality with Encrypted Query Processing," in the *Proceedings of the $23^{rd}$ ACM Symposium on Operating Systems Principles (SOSP)*, Cascais, Portugal, October 2011, is a system for encrypting relational data bases, which combines various encryption algorithms to enable encrypted execution of SQL operations. By combining various algorithms, the proposed system requires less computing than known fully homomorphic algorithms, wherein the execution times are only extended by 30-50% over operations without encryption. The system is tailored specifically to relational data bases, and is not suitable for other data base technologies. Depending on which operations are to be applied to the data, the encryption strength may be lower on the whole, because the encryptions that have been employed cannot be selected arbitrarily, and are thus less secure. Therefore, not all operations can be reliably executed on all encrypted data, wherein Raluca claims 99.5% reliability for operations executed in an example that was tested.

Thus, none of the aforementioned methods address the requirements stipulated for data exchange and secure storage of data in a distributed IT infrastructure making use of cloud resources. The invention described herein combines various concepts in an innovative manner, and describes a transparent data encryption for machine to machine communication, e.g. on the basis of REST technology, but is not specifically limited to this technology, and can be applied to other forms of communication, storage, and processing of structured data. Advantageous properties of the REST scheme that make it suitable for use with and describing the present invention are the clear and simple structure of the REST paradigm, the structured resource-based model, and the stateless protocol of the queries enabling the use of an encryption filter for the transparent encryption of data, which are then stored and processed in an encrypted form at the server end. By focusing on atomic operations, such an encryption can be easily implemented for REST queries.

The object of the invention is to impede or prevent unauthorized access to data during communication between a client and a server, as well as when the data is stored and processed on the server. It is assumed thereby that neither the communication channel nor the server itself are trustworthy, and neither the client nor the server can provide or adopt measures for counteracting the aforementioned risks of unauthorized access, e.g. through cryptographic methods.

BRIEF DESCRIPTION OF THE INVENTION

This object is achieved in accordance with the invention with a generic method for encrypted communication between a client and a server, wherein the communication comprises a first and second query message, each of which contains one or more query elements, and a first and second response message, each containing one or more response elements, in that the method comprises the following steps: receiving a first query message from the client; breaking down the first query message into query elements; determining, for at least one query element of the first query message, whether the query element is to be encrypted, on the basis of a predetermined configuration; determination of key data for the encryption for each query element that is to be encrypted, on the basis of the predetermined configuration, encryption of the query element in an encrypted query element on the basis of the key data for encryption, and updating and storing the encryption data in a key manifest; composing a second query message from the query element of the first query message, wherein each query element that is to be encrypted is replaced with the corresponding encrypted query element; sending the second query message to the server; receiving a first response message from the server; breaking down the first response message into response elements; determining, for each response element of the first response message, whether the response element needs to be encrypted, on the basis of the predetermined configuration; determination of decryption key data from the key manifest for each response element that needs to be encrypted, and decrypting the response element on the basis of the encryption key data; composing a second response message from the response elements of the first response message, wherein each response element that needs to be decrypted is replaced by the corresponding decrypted response element; sending the second response message to the client.

Thus, the method according to the invention allows the client to send a query message containing unencrypted query elements and to receive a response message belonging to the communication that contains unencrypted query elements, and allows the server to receive a corresponding query message containing encrypted query elements and to send a corresponding response message containing encrypted response elements.

The method according to the invention thus enables the encryption and decryption steps to be executed by neither the server nor the client.

The method according to the invention thus makes it possible to keep the complexity of the client and the complexity of the server low, or to reduce the complexity in comparison with conventional security architectures that make use of cryptographic methods at the server and/or client end.

The method according to the invention also makes it possible to encrypt only a portion of a query message, or decrypt only a portion of a response message, such that an overall more efficient encryption and decryption of the communication is obtained, in particular with complex encryption methods, e.g. homomorphic encryption. An increase in the processing efficiency can also involve the selection of specific different cryptographic methods, comprising encryption and decryption for different query elements or response elements, if there are different requirements for the processing and protection of individual query elements or response elements, and the different cryptographic methods require different levels of computing effort in the processing thereof.

As a result of the method according to the invention, neither key data nor a key manifest need to be stored by the client or the server, resulting in a security architecture that ensures a higher security, e.g. if the client and/or the server have experienced data loss, or been the victim of unauthorized data access.

The method according to the invention also has the advantage that certain query elements, e.g. those query elements that contain sensitive data requiring protection, are only sent to the server in an encrypted form, and this data can only be processed or stored on the server in this encrypted form.

By way of example, the predetermined configuration could only encrypt those query elements of the first query message that do not affect the function of the query on the server.

This has the advantage and technological effect that no adjustments need to be made on the server with respect to the processing of encrypted data instead of unencrypted data, such that the server is basically suitable for processing encrypted as well as unencrypted data, without having to decrypt the encrypted data on the server.

This merely requires that the query is structured, or follows a predefined structure, such that a breaking down of the query into query elements is possible, wherein, in the framework of the breakdown into query elements, those query elements that require encryption can be distinguished from those not requiring encryption. Queries structured in this manner may have entirely different constructions, and access entirely different functions of a server, as shall be described below in greater detail. By way of example, the structured query can be a REST query, the attributes of which are to be encrypted, but it can also be an SQL query, in which the parameters of the query (as opposed to the SQL commands themselves) are to be encrypted, in order, e.g., to protect the private data of the SQL query from unauthorized accesses.

The key data in the method comprise, for practical purposes, information regarding the type of encryption, encryption algorithm, and key name or key name pattern. The terms, "type of encryption," and "key name or key name pattern," also include each corresponding type of key and encryption algorithm necessary for the decryption.

This has the advantage and technological effect that different types of encryption and encryption algorithms are used for different query elements and response elements.

Furthermore, the determination of key data for encryption and decryption with the method can depend on the respective query element of a query message or response element of a response message.

This has the advantage and technological effect that the value of a query element or response element may determine the key data, and thus, different types of encryption and encryption algorithms can be used, depending on the value of a query element or response element.

Furthermore, the communication between the client and the server can follow the "Representational State Transfer" (REST) scheme, and each query message and response message can be assigned to a resource with the method.

This has the advantage and technological effect that the method can be used for numerous client-server applications that are based on the REST scheme. The use of the method for encrypted communication requires no adaptation of the application with respect to the encryption, an in particular no modification of an existing client or server module of the application.

With the use of the method in conjunction with communication following the REST scheme, the encryption data and corresponding decryption data may differ for different resources, and a corresponding key manifest can be administrated for each resource.

This has the advantage and technological effect that the access, comprising a query and corresponding response, can take place on different resources, as set forth in the REST scheme, with different keys, types of encryption, and encryption algorithms, depending on the resource. This increases the security, because different keys can be used for different resources, for example. Furthermore, it is possible to individually protect data connected to a resource, which can be assigned to a specific person, for example, for each resource with a unique key, and thus improve data protection and implement data privacy.

When the method is used in conjunction with communication following the REST scheme, a key manifest can be generated, for example, when a new resource is created in response to a query message.

This enables the assignment of different keys to different resources in the manner of the REST scheme.

The invention likewise comprises a device for encrypted communication between a client and a server, wherein the device is disposed between the client and the server, wherein the communication comprises a first and second query message, each of which contains one or more query elements, and a first and second response message, each of which contains one or more response elements, comprising: means for receiving a first query message from the client; means for breaking down the first query message into query elements; means for determining, for at least one query element of the query message, whether the query element is to be encrypted, on the basis of a predetermined configuration; means for determining key data for each query element that is to be encrypted, for encryption on the basis of the predetermined configuration, and for encrypting the query element in an encrypted query element on the basis of the key data for encryption, and to update and store the encryption data in a key manifest; means for composing a second query message from the query elements of the first query message, wherein each query element that is to be encrypted is replaced by the corresponding encrypted query element, means for sending the second query message to the server, and means for receiving a first response message from the server; means for breaking down the first response message into response elements; means for determining whether a response element needs to be decrypted for each response element of the first response message, on the basis of the predetermined configuration, means for determining key information for decryption from the key manifest for each response element that needs to be decrypted, and for decrypting the response element on the basis of the key information for decryption; means for composing a second response message from the response elements of the first response message, wherein each response element that needs to be decrypted is replaced by the corresponding decrypted response element; and means for sending the second response message to the client.

The device is furthermore configured to execute the steps of the method for encrypted communication between a client and a server, as described above.

The technological effects and advantages of the device correspond to those specified earlier in reference to the method according to the invention and its exemplary embodiment variations.

The device for encrypting communication, as described, is configured as a proxy for practical purposes, wherein all of the communication between the client and the server takes place via a proxy, and wherein the proxy is connected to the client in a secure network.

This has the technological effect and advantage that the aspect of the encryption is transparent for the client and for the server. This means that neither the client nor the server need to take into account in particular the functionality or the circumstance that the communication does not take place directly between the client and the server, but instead, indirectly via a proxy, and is thus encrypted between the proxy and the server. A potentially necessary simple parameterization of the client network configuration, as is normal with the use of a proxy, also has no effect with regard to this principle or advantage. Under the stipulation that the connection between the proxy and the client takes place in a secure network, it is further ensured that the communication and data transfer, or transmission of individual query fragments and response fragments, via an unsecured network between the proxy and the server, only takes place in an encrypted form. As a result, absolutely no processing, storage, or transfer of sensitive data in the form of query and response elements that are to be encrypted, takes place on the server outside the secure network in an unencrypted form.

The invention also relates to a computer program containing computer programming code, which enables a computer to execute the method according to the invention when the computer program is executed thereon.

Preferred embodiments of the method according to the invention and the device according to the invention shall be explained on the basis of the figures. Therein:

DETAILED DESCRIPTION

Figure 1:
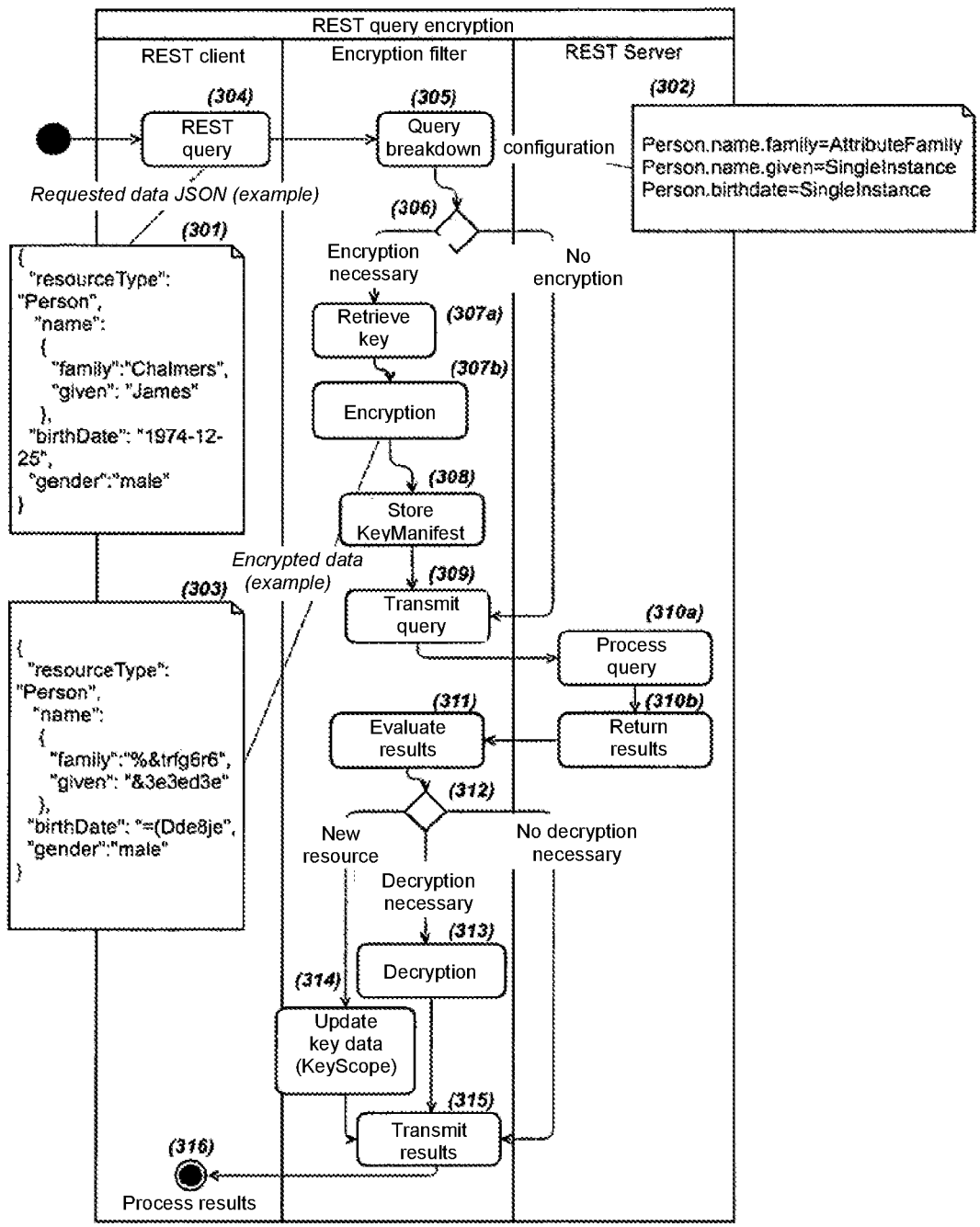
FIG. 1 shows an activity diagram illustrating the sequence of the method for encrypted communication between a client and a server.

In cloud computing in the framework of a public cloud, use is made of IT resources outside the infrastructure thereof. These resources are distributed among various users, such that there is a potential for the misuse of data. A further problem is data losses regarding the data location, i.e. the physical geographic data storage location, and loss of control over necessary security measures. In contrast thereto, security measures may be implemented by the company itself in a closed IT infrastructure of a company, in order to protect against data misuse and access, and to make it difficult for data to be misused, e.g. by employees of the company. In comparison with classic IT outsourcing, data is transferred, stored and copied in cloud computing via systems distributed worldwide. The advantages, e.g. inexpensive operating modules through scalability, are offset by an increased security risk. The provider is no longer able to provide information regarding the state and location of the data at all times. As a result, data can be easily manipulated in cloud computing, or end up in the wrong hands.

The advantages and opportunities offered by cloud computing, and positive effects associated therewith, are compelling. At the same time, it must be ensured that the data stored in the cloud infrastructure are safe from unauthorized access at all times. This also applies to data processing. Storage of sensitive data, e.g. personal data such as addresses, insurance data, credit card numbers, and health data, in a cloud infrastructure places particular demands on the data security.

A further problem in this context is that there is usually no revision-safe verifiability of the data management for the physical components of the cloud infrastructure. Cloud computing is limited specifically in fields in which sensitive data cannot be stored in a foreign country, e.g. for legal reasons.

Data in the cloud must be confidential. The encryption of data is an important field therein. However, for any useful processing and display of these data, they must either be unencrypted, or decrypted by the client, when accessed.

Modern cloud services frequently provide REST interfaces for accessing functions. This type of interface definition is increasingly used in the World Wide Web and in modern software architectures. The communication within a distributed application or the integration of cloud services in the specific applications frequently then takes place in accordance with the REST scheme. REST itself does not define an encryption process. A message encryption is normally used to protect REST queries. This has the disadvantage that the data nevertheless remain unencrypted after transmission by the server. When cloud services are used, this can be a problem, because the provider of a service, or an administrator could then have potential access to the unencrypted data. On the other hand, the use of cloud services and data storage in the cloud has numerous advantages over a local data storage.

There are numerous cloud services and applications that can be used by a company. Preferably, these services have no knowledge of the sensitive data, or acquire any knowledge as to whether encrypted or unencrypted data are being processed. It is therefore necessary that the encryption be transparent, without having to adapt the server components, or their having to know that encrypted data are being processed.

Furthermore, these services are often not controlled by the company, and are integrated in the applications and infrastructures thereof via an RPC interface, or API (application programming interface). REST compliant web interfaces are provided for this. In recent years, REST has increasingly become the primary standard in this field, replacing SOAP as an interface for machine-to-machine communication. The REST scheme can support queries in various formats, such as XML or JSON thereby.

The method described below makes use of local applications and services in a secure environment, that enable the incorporation of could services and resources via a REST API. Encrypting methods are used thereby, to protect the data from unauthorized access. The integration of encryption methods is transparent for the application, and can be adapted in a flexible manner to numerous scenarios. The keys for encrypting and decrypting the data always remain at the level of the user, or the responsible organization.

Relevant technologies shall first be explained below, and the technical terms used herein shall be defined.

The term, "Representational State Transfer," abbreviated as "REST," refers to a programing paradigm, or architecture scheme for web applications, described, e.g., under http://de.wikipedia.org/wiki/Representational_State_Transfer (https://en.wikipedia.org/wiki/Representational_state_transfer). REST is an abstraction of the structure and the behavior of the World Wide Web. REST requires that a web address, URI, represents exactly one website content, and that a web/REST server responds to numerous queries with the same URI and with the same website content. The main purpose of REST is to enable machine-to-machine communication. REST is a simple alternative to similar methods such as SOAP and WSDL, and the related method RPC. In differing from many of the architectures that are used, REST does not encode process data in the URI, because the URI lists locations and names of resources, but not the functionality that the web service offers to the resource. The advantage with REST is that a majority of the infrastructure needed for REST, e.g. web and application servers, HTTP-capable clients, HTML and XML parsers, and security mechanisms, are already present in the WWW, and many web services are REST-compliant per se.

The "Hypertext Transfer Protocol," "HTTP," is a stateless protocol for data transfer at the application level via a computer network. It is mainly used to upload websites, i.e. hypertext documents, from the World Wide Web, WWW, to a web browser. It is not, however, limited thereto in principle, and is also used widely as a general data transfer protocol. HTTP has been standardized by the Internet Engineering Task Force, IETF, and the World Wide Web Consortium, W3C. The current version is HTTP/1.1, and HTTP/2 is presently in the development stage. The further development is organized by the HTTP workgroup of the IETF HTTP/2. There are supplementary standards for HTTP, e.g. HTTPS for encrypting transferred content, and standards based thereon, such as the transfer protocol WebDAV.

A "proxy" is a communication interface in a network. It functions as an intermediary that receives queries, and then establishes a connection to other websites via its own address.

The "Remote Procedure Call," "RPC," is a technology for implementing inter-process communication. It enables functions to be requested in other address spaces. Normally, the functions are executed on a computer other than the computer retrieving the program.

"JavaScript Object Notation," abbreviate "JSON," is a compact data format in an easily readable text format for purposes of data exchange between applications, and is described, e.g., under http://www.json.org.

"Extensible Markup Language," abbreviated "XML," is a markup language for depicting hierarchically structured data in the form of text files. XML is used for platform and implementation dependent data exchange between computer systems.

"XML Path Language," "XPath," is a query language developed by the W3 consortium, for addressing and evaluating portions of an XML document.)(Path serves as a basis for a series of further standards, such as XSLT,)(Pointer, and XQuery. XPath 2.0 replaced)(Path 1.0 on Jan. 23, 2007, which had been in use since 1999.)(Path 2.0 has redefined some of the concepts of)(Path 1.0, and also has a substantially expanded range of functions, e.g. supporting regular expressions for strings of characters.

The term, "sensitive data" is understood in the present context to mean data that have a special security classification, e.g. personal data such as addresses, social security numbers, bank/credit card connections, and health data. The classification of data as sensitive or non-sensitive may vary depending on the field of use, and is at least aligned with the legal data protection regulations.

A "responsible organization" uses an application, which may be used for processing sensitive data, and is legally responsible for the data processed therewith.

The "public zone" is a network zone that is open to the public, and via which a public cloud, by way of example, can be accessed. This network is not controlled by the responsible organization, and is therefore not secure by definition, and is not suitable for processing sensitive data in plain text. The "trusted zone" is a network zone controlled by the responsible organization. The network can only be accessed by the users of the organization, and is protected against external incursion according to the state of the art. The user clients are assigned to the trusted zone, which is likewise a private cloud.

"Encryption" is the process with which a clear, readable text, i.e. plain text, or other types of data, such as audio and image recordings, is converted into an "unreadable" format, i.e. a not easily interpretable character sequence, i.e. ciphertext, using an encryption process, i.e. a cryptosystem. One or more keys are used thereby as a decisively important parameter of the encryption.

Cryptographic "key management" is responsible for secure generation and storage of keys for encrypting data.

A "homomorphic encryption" is a cryptographic process that has homomorphic properties, by means of which it is possible to execute calculations on the cipher-text corresponding to mathematical operations in the corresponding plain text.

The term, "Hardware Security Module," "HSM," refers to an internal or external device for efficient and secure execution of cryptographic operations or applications.

The REST application architecture shall be described as follows. Data are exchanged via a stateless REST API in an application based on the REST architecture scheme. The REST design pattern is based on the definition of a series of resources and interconnecting links provided for the data. Each resource is defined by a unique URL. Simple atomic operations are defined for interacting with these resources, e.g. for generating or reading resources. Resources may contain different representations. A REST-compliant server may deliver different representations of a resource, depending on the requirements of the application, e.g. in various languages or formats, e.g. HTML, JSON or XML. The communication between components in a distributed application normally takes place thereby in a structured, machine-readable format, such as JSON or XML. "Structured" means that the representation of a resource for transfer in a query message, for processing, storage or transfer in a response message, is composed of one or more elements, wherein an element corresponds, for example, to an attribute of the resource. A stateless client-server protocol is used for the conversion of the REST paradigm. Primarily, HTTP and HTTPS are used as the application-level protocol. REST standardizes the interfaces between systems to a manageable and standardized number of actions with respect to the expected behavior. The specific actions are not defined in REST, but all of the actions are defined in general, normally by the protocol that is used at the application level. Although REST does not require a special implementation and special protocol as an abstraction of the WWW, it should be noted that HTTP is used almost exclusively, by means of which the number of actions is defined. REST clients that use HTTP employ the following commands for requesting or modifying resources:

| Command (HTTP methods) | Description |
| --- | --- |
| GET | Requests the specified resource from the server. GET has no side-effects, i.e. the retrieved data remain unmodified on the server. For this reason, GET is also referred to as a secure operation. |
| POST | Inserts a new (sub)resource below the specified resource. Because the new resource does not yet have a URI, the URI addresses the superordinate resource. As a result, the new resource link is returned to the client. POST can also be used in the broadest sense to depict operations that are not covered by other methods. |
| PUT | The specified resource is applied. When the resource already exists, it is modified. |
| PATCH | A portion of the specified resource is modified. Side-effects are allowed thereby. |
| DELETE | Deletes the listed resource. |
| HEAD | Requests metadata for a resource. |
| OPTIONS | Checks which methods are available on a resource. |
| CONNECT | Is used to conduct the query through a TCP tunnel. |

| Command (HTTP methods) | Description |
| --- | --- |
| | Is usually used to establish an HTTP connection via an HTTP proxy. |
| TRACE | Returns the query as it was received by the target server. Used in order to determine modifications to the query by the proxy server. |

An embodiment of the method according to the invention is explained below. The embodiment described therein relates to a method for encrypting data in a transparent manner in a distributed IT application, and for decrypting, and processing encrypted data. The embodiment illustrates the method with a REST interface, by way of example, in particular in a query and a response. The describe method is not limited, however, to an interface based on the REST architecture model, and can also be used, e.g. on interfaces for communication in accordance with SOAP, JSON-RPC, or XML-RPC. The following exemplary embodiment relates concretely to the REST interface merely for purposes of simplicity and readability.

The query generated by a REST client is analyzed by an additional filter, and dynamically encrypted on the basis of existing settings. The structured data (resources) in a REST query are encrypted thereby at the elemental level. The configuration defines the manner in which the encryption is to take place on the basis of a unique path to the element. The method provides flexible possibilities for this, dependent on the application scenario and the security and functional requirements of the application. The elements are encrypted and the REST query is then sent to the end point. The system at the end point has no knowledge regarding the encryption, and processes the data in the encrypted form. When data are read, the delivered resources are likewise identified on the basis of the element path, and the appropriate keys are retrieved from the key management. The decryption takes place thereby such that it is transparent to the retriever. The encryption and key management takes place thereby on the part of the retriever, and remains at that level.

The invention describes a method for the dynamic and transparent encryption of REST queries in a distributed application environment. As a result, a secure processing and storage of sensitive data can be ensured in a hybrid structure that allows for numerous security zones.

The method has at least the following advantageous properties:
  The method makes use of the advantages of the REST paradigm, in order to enable transparent encryption of file contents;
  Selective encryption of message contents from atomic REST API queries, without this having to be known by the REST server and the client.
  No structural modification of the message content, because the encryption takes place on the basis of attributes.
  Key data are separated from file contents, making it difficult for an attacker to decrypt the data.
  Detailed control over the data that is to be encrypted and the type of encryption through the use of a flexible configuration.
  The encryption can be adapted to the application logic through the use of different encryption levels and encryption algorithms, so that operations, such as a search, can still be carried out with encrypted data.

The following entities shall be described in greater detail below: an encryption filter, an encryption component, a REST client, a REST server service, also referred to as a REST service, and an optional hardware security module, HSM. The REST client, the REST service, and the HSM can each comprise numerous instances, components, or services, and implemented with different technologies. The method according to the invention can be implemented independently of this concrete configuration of the REST client and the REST service.

The use of encryption in REST-based applications shall be described below. It is possible to analyze and encrypt the simple atomic operations and the structured data format on the basis of a predefined configuration through the relationship of each REST operation to a unique resource.

It is ensured thereby that the key management and the encryption take place only in a trustworthy, secure environment, and the key never leaves the control of the responsible organization.

The invention describes a method and how it can be carried out such that it is transparent for the application logic that is implemented on the part of the client and/or server itself.

The encryption filter (English: "encryption filter") is the central component that receives the query (English: "request") from the client, which executes the encryption on the basis of a predefined configuration (English: "policy"), and then sends the query to the server.

The filter analyzes the REST query and checks the useful data contained therein. This can either by structured data, i.e. resources, or URL parameters, e.g. search questions.

A request to create a new resource takes place, e.g. as a POST query:

POST [bse-url]/[type] {?_format=[mime-type] }

The useful data format can be determined on the basis of a transferred format parameter, or a standard configuration. One example is given below for a resource "person," comprising the attributes "resourceType," "name," and "birthDate." A simple person resource 101 in JSON format with attributes for a name 102, broken down into a family name 103, first name 104, and a birthdate 105, can look like:

| | |
| --- | --- |
| { | |
|   "resourceType": "Person", | (101) |
|   "name": | (102) |
|   { | |
|     "family": "Chalmers", | (103) |
|     "given": "James" | (104) |
|   }, | |
|   "birthDate": "1974-12-25" | (105) |
| } | |

If, for example, the representation of a resource of the type "person" is transmitted in a query message, the representation of individual attributes is referred to as a query element. If the representation of a resource of the type "person" is transmitted in a response message, the representation of individual attributes is referred to as a response element.

An attribute is specified in the depicted example in the JSON format as a combination "<Attributname>:<Attributwert>" [EN: "<Attributename>:<Attributevalue>"]. The representation of an attribute may vary in other formats, e.g. XML, from the combination specified here. The term "element," and in particular the terms "query element" and "response element," may thus refer to the combination "<Attributname>:<Attributwert>," or merely to the attribute value.

A given representation of a resource, e.g. in a message, as a character sequence, can be broken down into elements corresponding to the respective attributes of the resource. This determination of the elements representing a resource is also referred to as breaking down the message, or breaking down the query message or breaking down the response message.

The filter then accesses its configuration, which defines whether and how an appropriate element is to be encrypted. The configuration can be a simple key-value combination thereby, which defines the attribute, e.g. Person.name.family, or it can contain more complex query language, e.g. plain text expressions, XPath, XQuery, JSONPath, which find the appropriate attribute on the basis of the defined queries. The formation of the configuration is irrelevant here, and configurations in the form of simple text files, XML, configurations or data base entries are also conceivable. A simple text-based configuration, using XPath expressions could thus look like:

```
# Konfigurationsblock für Personen Ressource
[Person]                                                    (201)
# Ausdruck um den Ressourcentyp zu ermitteln
type.query=/resourceType
# Ausdruck für die Suche des Familiennamens
attribute.1.query=//name/family                             (202)
# Verschlüsselungsmethode des Familiennamens
attribute.1.encryption=AttributeFamily                      (203)
# Schlüsselname für das Auffinden eines passenden Schlüssels
attribute.1.keyname=Person.Family                           (204a)
# Verschlüsselungsalgorithmus
attribute.1.algorithm=AES256                                (205)
# Ausdruck für die Suche des Vornamens
attribute.2.query=//name/given                              (202)
# Verschlüsselungsmethode des Vornamens
attribute.2.encryption=SingleInstance                       (203)
# Schlüsselname für das Auffinden eines passenden Schlüssels
attribute.2.keyname=Person.Given.{id}                       (204b)
```

There may be an arbitrary number of attribute expressions (202) in the configuration in each configuration block for a resource (201). The encryption type (203), the encryption algorithm (205) and the key name (204a) or a name pattern (204b) can be specified for each attribute that is to be encrypted. If applicable, standard values may also be employed. The name pattern can likewise contain complex expressions, depending on the implementation. URL query parameters of the accessed URL can also be analyzed in the same manner as resource attributes. The configuration can depend on the resource types, the retrieved REST method, or the URL, or a combination thereof.

The process in the encryption filter comprises the following steps:

1. The useful data 301, present, e.g., in JSON or XML format, are taken from a query created in step 304, and analyzed and broken down in step 305 on the basis of the configuration;
2. Which attributes that are to be encrypted, the query elements, are determined in step 306;
3. For each attribute, the appropriate key is retrieved, or a new key is created, in step 307a;
4. The attribute is encrypted in step 307b, wherein the useful data 303 are then accompanied by their respective encrypted attributes;
5. The key data are stored in step 308;
6. When all of the attributes have been encrypted in accordance with the configuration, the query is transmitted in step 309;
7. The server processes the query containing the encrypted attribute in step 310a;
8. The results of the query are transmitted by the server in step 310b, and received by the filter, and re-analyzed in step 311;
9. After checking in step 312 whether this is a resource, the potentially encrypted attributes are decrypted in step 313;
10. If a new resource is created in the context of the query message, or a new resource ID, the returned resources, URI or ID, are used to link the key data with the resource, thus updating the key information in step 314;
11. The decrypted result is returned to the client in step 315, and further processed in the unencrypted form in step 316.

The steps of this process are shown in FIG. 1, wherein the execution of the steps is assigned to the respective entities, client, filter or server, by column.

The encryption filter can be used in two different ways for using the transparent REST encryption, which shall be described below with reference to FIG. 2 and FIG. 3.

Figure 2:
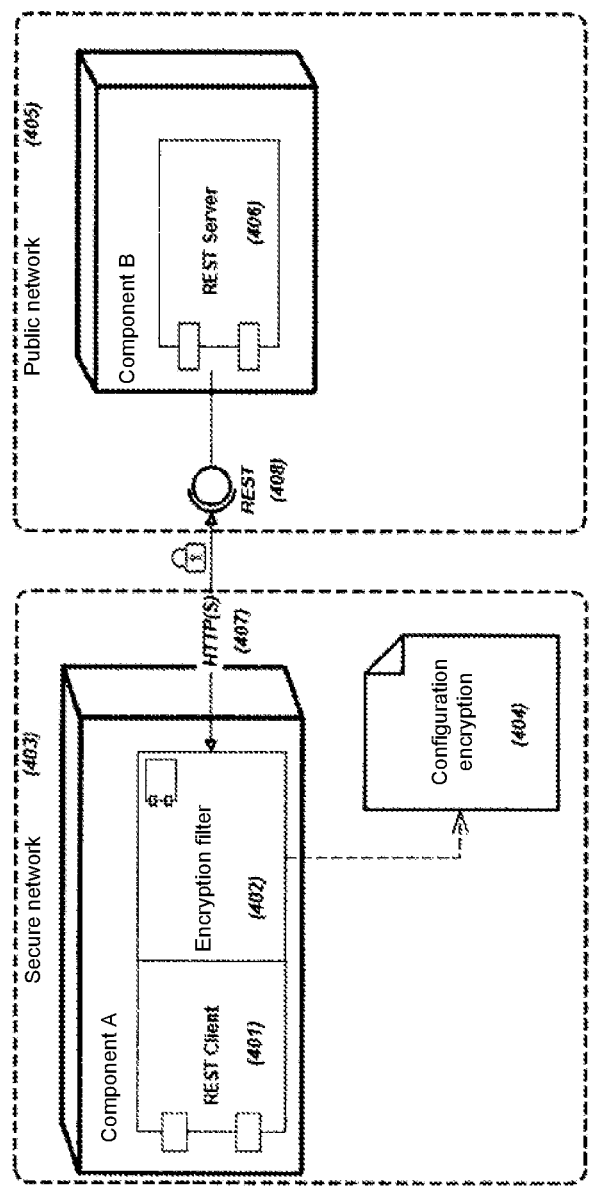
FIG. 2 shows a component diagram of a first configuration and use of the encryption filter.

FIG. 2 shows the first type of use and assignment, wherein the client has the query filter 402 (English: request filter), where the encryption is thus carried out. The filter is integrated directly in the application by the REST client 401. This can take place through adaptations in the application code, or through the use of a filter function, which can be introduced in current web and REST clients, optionally through configuration. The REST server 406 can operate in a public network zone 405, and provides a REST interface 408. The REST client 402 and the encryption filter 403 should be operated in a secure network zone 403, in order to ensure security. The encryption configuration 404 determines how a query 407 that has been sent is to be encrypted and how a response is to be decrypted.

Figure 3:
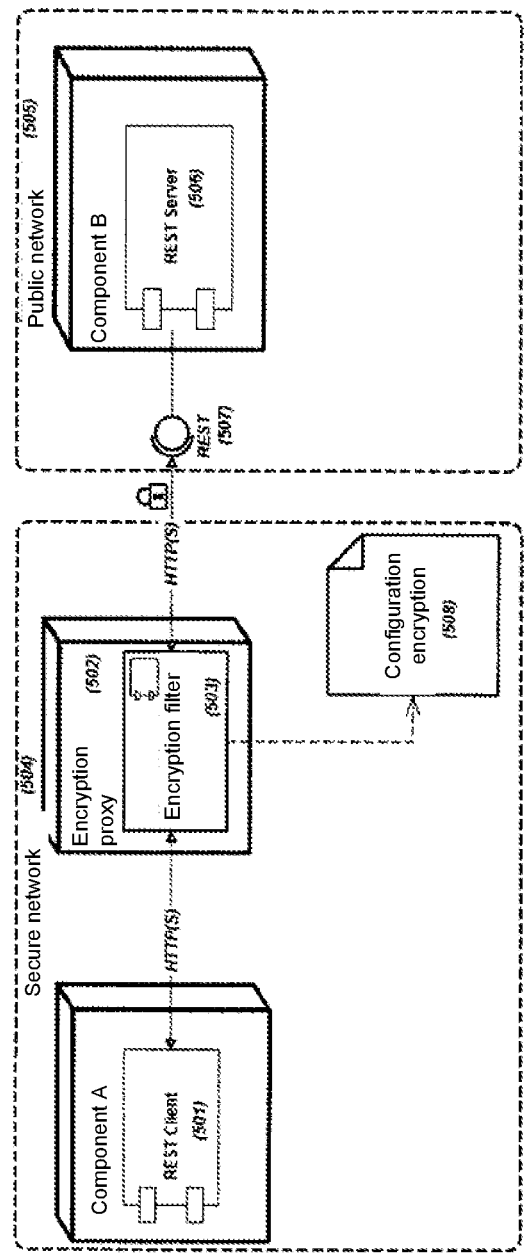
FIG. 3 shows a component diagram illustrating components for controlling and executing the encryption, and for managing and generating key data and keys, and the interaction thereof.

FIG. 3 shows a second variation of the use of a proxy 502 for the encryption. This proxy is a unique node in a secure network 504, via which all of the queries of the REST client 501 are sent to the REST server 506, 507. The encryption filter 503 analyzes the query in the proxy, as in the first case, and executes the encryption on the basis of the configuration 508. The use of a proxy is transparent for the application, but requires an additional network node, which could require additional configurations or adaptations in the application when HTTPS is used.

Figure 4:
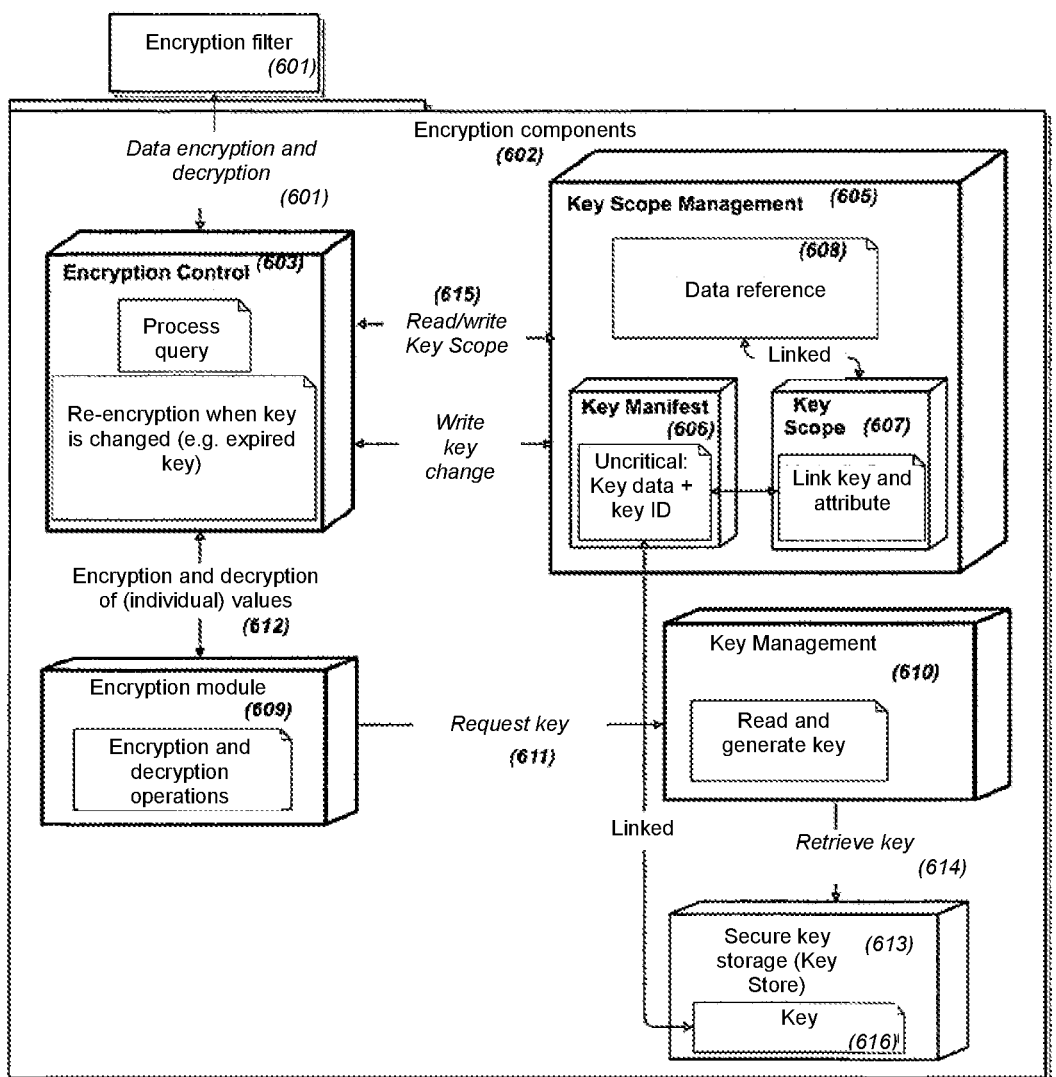
FIG. 4 shows a flow chart, showing a query sequence and interaction between the encryption components, using an encryption by way of example.

Components for controlling and executing the encryption, and for managing and generating key data and keys, and the interaction thereof, shall be described below with reference to FIG. 4.

The encryption of the data is carried out via an encryption component 602, which comprises various functions. Firstly, the component that is retrieved by the encryption filter 601, as described above, is responsible for the encryption and decryption of the data. Furthermore, the encryption components provide a flexible key generation and management. These ensure that the data can be encrypted with different keys, depending on the respective configuration. It is decided whether data will be encrypted during a REST query on the basis of the configuration.

The REST architecture model describes the data as resources that have links between the resources. Each resource contains a number of attributes (English: "attributes") that contain the data values. Resources can describe a hierarchy that has parent and child resources through the appropriate links. The encryption mechanism of the REST API encryption allows the encryption of the data set at different levels and with different keys, depending on the security and performance requirements. By way of example, all of the properties of a resource can be encrypted with a resource-specific key, or specific attributes of resources of the same type, can be encrypted with the same key. This configuration makes it possible to execute limited searches of encrypted data, using a homomorphic encryption algorithm, without decrypting them. Furthermore, keys for resource hierarchies can also be created and used to encrypt associated data sets with the same key, which may result in better performance. Various operations can also be combined.

The encryption possibilities are divided into different encryption levels for this. The encryption levels can be adapted and supplemented, depending on the implementation scenario. This must then be taken into account in the actual implementation of the encryption filter. Thus, aside from the general possibilities specified below, application-specific encryption levels are also conceivable, e.g. key selection on the basis of a time stamp, such that, e.g. all of the data sets in a specific year are encrypted with the same key.

In general, different encryption levels (English: "encryption levels") are conceivable and applicable. Exemplary encryption levels are listed in the following table:

| Encryption level | Key scope | Description |
| --- | --- | --- |
| Type | Resource type | All resources of the same type are encrypted with the same key. |
| SingleInstance | Resource instance | Each instance of a resource is encrypted with a different key. |
| SingleAttribute | Resource instance attribute | Each attribute of a resource is encrypted with a different key |
| OneTimeInstance | Resource instance | Each instance of a resource is encrypted with a different key, and with each new encryption, a new key is generated. |
| OneTimeAttribute | Resource instance attribute | Each attribute of a resource is encrypted with a different key, and a new key is generated with each new encryption. |
| AttributeFamily | Resource attribute family | The same attributes of resources of the same type are encrypted with the same key. |
| ParentResource | Resource tree | A hierarchy of resources is encrypted with the same key. The key depends on a specific parent node. |

A key manifest is generated for each encrypted resource during the encryption process. This key manifest describes the level and type of encryption, referred to collectively as the key scope, and indicates which key has been used. Furthermore, a unique indication, i.e. an ID is generated, making it possible to determine which resource this data refers to.

The data can later be encrypted with the correct key or used to execute additional tasks, such as a periodic key exchange, on the basis of this data.

The data can be encrypted in step 602 and decrypted in step 604 during a REST query via a key control component, (English: "Encryption Control Component"), by the encryption filter. In order to ensure the integrity of the encryption, all of the components of the encryption component should be instantiated in the secure zone. The key component retrieves the key data for the encryption and decryption of a resource from the key scope management in step 615. The key scope management 605 manages data regarding the key that is used. The key data is stored in the key manifest 606, while the key manifest link to the data 608 is stored in the key scope 607. The key scope 607 contains the data regarding which keys 616 resources and attributes have been encrypted with. The key scope management stores the key manifest and the reference to the encrypted data in a key scope data set 607. The key scope data 607, keys 616, and encrypted data 608 are thus separated from one another.

The appropriate key 616 is determined on the basis of the key manifest in step 611, and retrieved from the key store 613 via the cryptographic key management 610 in step 614. The key management can also be provided by an external component, e.g. a hardware security module. The actual encryption or decryption is executed in step 612 by an encryption module 609. The encryption module itself requires no knowledge of the resource model or the configured encryption levels.

Encryption, encryption algorithms and cryptographic key management are known concepts. The specific concrete methods and technologies that are used here are irrelevant with regard to the invention. It must be noted, however, that there may be specific restrictions and requirements for the encryption due to the implementation scenario, the use and the data that are to be encrypted, e.g. the use of a homomorphic encryption algorithm in order to permit certain processing functions to be carried out on the encrypted data.

Figure 5:
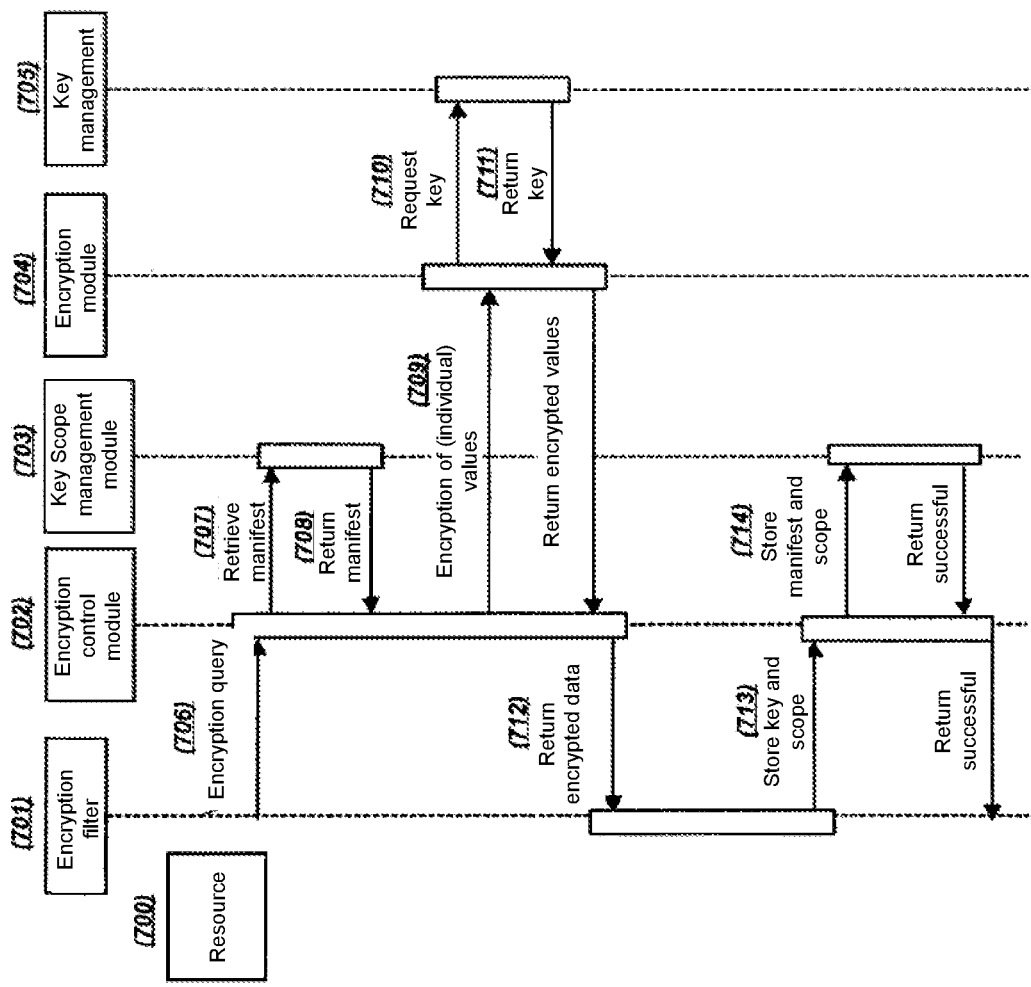
FIG. 5 shows a scenario for the use of an encryption filter for a REST-based data base service, provided by the server in a cloud.

The sequence of an encryption and the interaction of the participating components shall be described below with reference to FIG. 5. If a resource 700 is to be encrypted by the encryption filter 701, the encryption filter 701 provides data to the encryption control module 702, regarding the resource, attribute ID, and encryption process, in step 706. The encryption control module 702 requests the appropriate key manifest via the key scope management module 703 in step 707, or generates a new manifest and a new key, if there is no key manifest under the given ID. The key manifest is obtained in step 708, and the data that are to be encrypted are then transferred to the encryption module 704 in step 709, in accordance with the encryption configuration. The encryption module can then retrieve the appropriate key from the key management 705 in step 711 on the basis of the key manifest, after the query in step 710, and encrypt the data, and transfer the encrypted data to the encryption filter in step 712. If the resources URI/ID are known during the encryption, the key manifest is stored with the appropriate references in steps 713 and 714. When the creation of a new resource is requested, the resources URI/ID are first known after a successful processing by the REST server. A temporary ID is then generated, which is updated with the correct resources URI/ID in step 713 by the encryption filter, on the basis of the response by the REST server.

Figure 6:
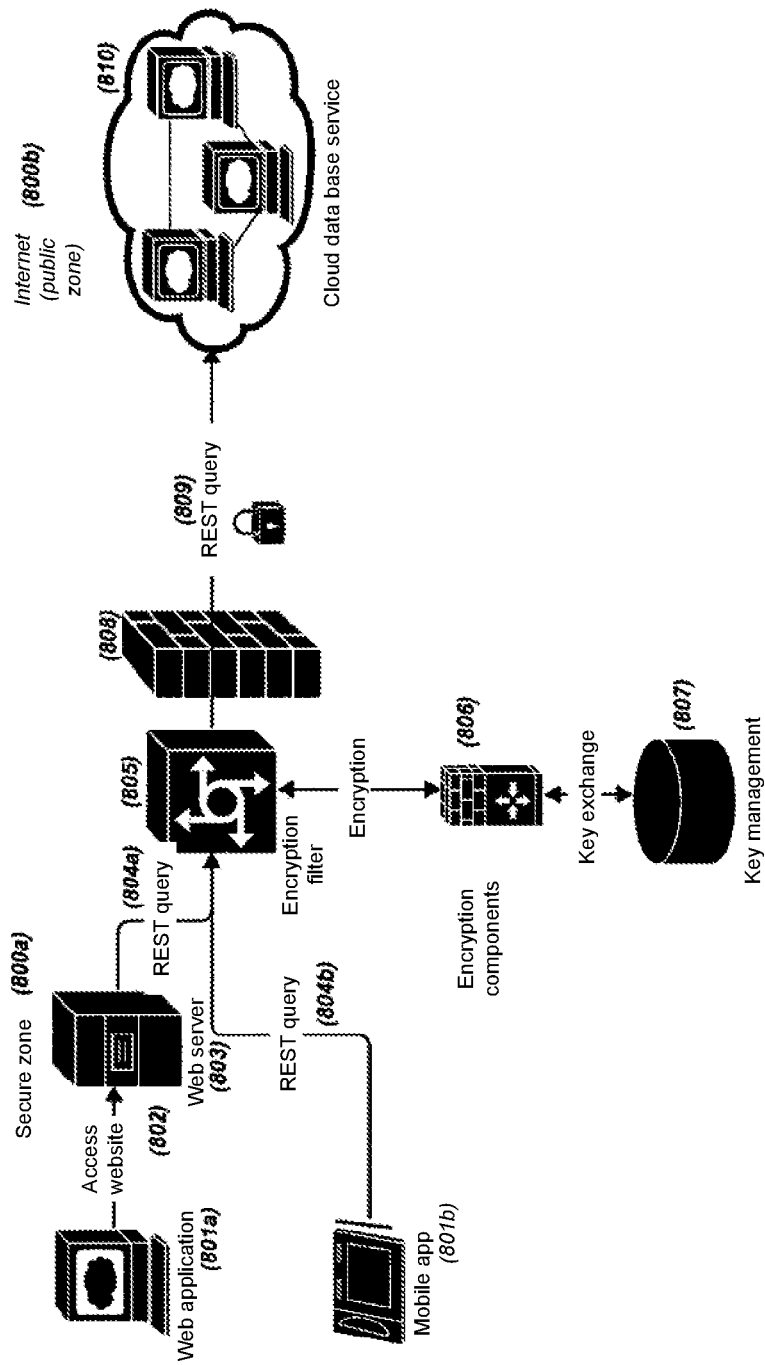
FIG. 6 shows a scenario for the use of an encryption filter for a REST-based data service, provided by one or more servers in a cloud.

FIG. 6 shows a scenario for the use of an encryption filter for a REST-based data base service, provided by one or more servers in a cloud. In this scenario, an application is executed within the secure zone 800a, e.g. a web application 801a on a web server 802, a desktop application, or a mobile application, app, 801b on a smartphone. The data are displayed thereby within the secure zone, which is protected against unauthorized access by the typical technological measures, e.g. a firewall 808. A data base service in a cloud 810, available via the internet public zone 800a, is used to persistently store the data. The service provides a REST interface. Examples thereof are Mongolabs, the REST interface of which is listed under https://docs.mongolab.com/restapi/, or elasticsearch, listed under http://www.elasticsearch.org/. The data stored in the cloud service are not under the control of the responsible organization. By way of example, a service provider could obtain knowledge of data, or even modify data such that they cannot be recognized.

The encryption, data security and data integrity can be ensured with the use of a REST interface for storing and loading data. The attributes are partially encrypted by the encryption filter 805. The encryption uses the encryption components 806 inside the secure zone for this. The key and key data are stored and managed inside the secure zone, and never leave this zone. This can then take place in a data base in the public zone, without the sensitive data being readable.

By way of example, a web server can store and read 804a the data from the data base service in accordance with REST here, and use this data in HTML sites to display it in a web browser.

An app may access the REST API 804b of the data base service directly and displays the data in the app.

The data storage takes place via a REST-POST command in the cloud data base service. Such an API could look like:

```
POST /databases/{database}/resources/person
Content-Type: application/json
Body: Resource
Return: id
```

The data storage shall be explained in greater detail using simple REST resource by way of example, which indicates a person, also referred to hereinafter as a "person resource."

A person resource has attributes for the resource type, "resourceType" 101, name, "name" 102, separated into the first name, "given" 104 and the surname, "family" 103 and a date of birth, "birthDate" 105.

```
{
    "resourceType": "Person",              (101)
    "name":                                (102)
    {
        "family":"Chalmers",               (103)
```

-continued

```
        "given": "James"                   (104)
    },
    "birthDate": "1974-12-25"              (105)
}
```

The configuration, or policy, described above, cf. 201 to 204b, provides that, among other things, the surname is encrypted with a resource type-specific key. As a result, all of the person resources use the same key. This makes it possible for the server to search for specific resources via the attribute "name," regardless of whether the attribute is only available to the server in an encrypted form, because the "name" attribute for all resources is encrypted with the same key. Depending on the algorithm, this may have a variety of limitations, e.g. only identical matches, or searches for word fragments in the case of additive homomorphic encryption.

The birth date and the first name are encrypted with an instance-specific key, such that each person resource uses a unique key.

The encrypted resource could appear as follows after it has been stored. All of the attributes are encrypted 902. After storage, an ID 901 with the value "4711" is present in the data set.

```
{
    "resourceType":                "Person",
    "id": "4711"                              (901)
    "name":
    {
        "family":"%&trfg6r6",                 (902)
        "given": "&3e3ed3e"                   (902)
    },
    "birthDate": "=(Dde8je",                  (902)
}
```

References to the keys that are used are managed in the key management. The keys themselves can be stored in a key data base or an HSM.

The following data are stored by the key management:

| Resource type | Resource ID | Attribute | Encryption mode | Key | Remarks |
|---|---|---|---|---|---|
| Person | | name.family | AttributeFamily | 1 | The general key for attribute encryption of the attribute family. |
| Person | 4711 | name.family | AttributeFamily | 1 | The specific key for encryption of the attribute family for the instance 4711. Through decryption and limitations in the key use, this may differ from the currently valid general key in some circumstances. |
| Person | 4711 | | SingleInstance | 2 | The currently valid instance key for the person instance 4711 |
| Person | 4711 | name.given | SingleInstance | 2 | The specific key for encrypting the attribute given for the instance 4711 |
| Person | 4711 | birthdate | SingleInstance | 2 | The specific key for encrypting the attribute birthdate for the instance 4711 |

The data request takes place via a REST-GET command to the cloud data base service. The query message corresponding to the command could look, e.g., like:

```
GET /databases/{database}/resources/person?id=4711
Content-Type: application/json
Antwort: Eine Ressource
```

The encryption filter checks the URL and the parameters to determine whether one or more parameters need to be encrypted. Because the ID parameter is not encrypted, the request is transmitted without modifications.

This results in returning the encrypted person resource to the filter. The filter analyzes the results, and realizes that this a resource having the type "person" with the ID "4711." On the basis of the associated policy, the filter realizes that an encryption is necessary. The filter queries the encryption module that has the data regarding type and ID. The appropriate key can be retrieved from the key management with this data, and the data are decrypted.

The decrypted resource is then returned to the requester.

The search takes place via the same REST-GET command. Only supplementary search parameters are transmitted.

```
GET /databases/{database}/resources/person?query={"name.family":
"Chalmers"}
Content-Type: application/json
Antwort: Eine oder mehrere Ressourcen
```

The encryption filter checks the URL and parameters again, to determine whether one or more parameters need to be encrypted. It is determined that the search parameter "name.family" uses an (attribute) family-based encryption, and the parameter is encrypted with the appropriate key from the key management. In order for the search to function, the key that is used for the encryption of the surname must be the same for all of the resources, and the algorithm must also generate the same encrypted values for identical plain text values. When an additive homomorphic algorithm is used, it is possible to perform searches for word fragments.

The response could then look like:

```
GET /databases/{database}/resources/person?query={"name.family":
"%&trfg6r6"}
```

As a result, a list of encrypted person resources is returned to the filter. The filter analyzes the results and decrypts the data, as described above. The decrypted resource or resources are then returned to the requester.

With the use of supplementary logic in the encryption filter, scenarios can also be supported in which numerous keys exist for an attribute, e.g. when a key has only a limited validity before it expires, and one portion of the data is encrypted with the old key, and another portion is encrypted with the new key. The filter can encrypt the attribute with all of the possible keys here, and adapt the query accordingly, such that all values are searched for.

One example of the use of different encryption levels is described below, wherein a further fictive resource account is used by way of example. The account resource describes an account data set that has the following attributes:

```
{
    "resourceType": "Account",
    "id": "100",
    "customer": "4711",           // Referenz auf die Person
                                   // des Kunden (=Elternknoten
                                   // der Ressource)
(1001)
    "accountName": "James Chalmers    // Name der dem Konto
    GmbH",
                                   // zugewiesen ist
(1002)
    "accountNumber": "12345",      // Kontonummer
(1003)
    "validTo":"20171001",          // Gültig bis
(1004)
    "balance": "1000"              // Kontostand
(1005)
}
```

Various encryption levels are defined in the policy, in order to fulfill different security and function requirements.

| Resource | Attribute | Encryption | Description |
| --- | --- | --- | --- |
| Account | customer (1001 | None | The attribute contains the reference to the person resource assigned to the customer. This is in the framework of a parent node resource hierarchy. To use the hierarchical encryption according to parent nodes, it is useful for the reference to be readable without decryption, in order to avoid multiple decryptions. |
| Person | name.family (1003) | AttributeFamily | The name of the customer is encrypted in the person resource such that all resources of type "person" use the same key for the names. This makes it possible to likewise encrypt the corresponding search term for the name with the same key in searches, thus enabling a search of the encrypted data. When an additive homomorphic algorithm is used for the encryption, word beginnings can also be searched. |
| Account | accountName (1002) | ParentResource (Person) | The account name is encrypted with a key determined by the parent node. In this case, this is in reference to the person with ID 4711. All account resources assigned to this person use the same key for encrypting the account name properties. The advantage with this encryption level is that only a few keys are |

-continued

| Resource | Attribute | Encryption | Description |
| --- | --- | --- | --- |
| | | | necessary for encrypting resource hierarchies. This improves the encryption and decryption speeds as well, because with an appropriate implementation, the key needs only to be retrieved once in order to decrypt a resource hierarchy. |
| Account | accountNumber (1003) | SingleAttribute | A specific key is used for the attribute "accountNumber." Each resource instance generates a unique key for the attribute. This increases the security, because numerous keys are needed for a complete decryption of a resource. |
| Account | validTo (1004) | SingleInstance | A specific key is used for all of the attributes of the instance that are encrypted with the level "SingleInstance." Each resource instance generates a unique key. In this level, a key may be able to decrypt numerous attributes of an instance, although each instance has a unique key. This method is thus a good compromise between higher security obtained with numerous keys, and speed during the encryption and decryption of resources. |
| Account | balance (1005) | OneTimeAttribute | This encryption level offers the highest security. With each new encryption of the resource, e.g. during an update, a new key is generated, and the rest of the attribute is encrypted therewith. It is thus possible to also ensure that the data are not multiplied by the server. It is thus possible to prevent, e.g., a data base administrator from being able to copy the encrypted value of an account, and later introduce this into the data set when the actual value is lower. Because the original value has been encrypted with a different key, such a manipulation can be discovered. |

The description of the device according to the invention relates to components or elements serving as a means for executing individual steps of the method according to the invention. It is clear to the person skilled in the art that the concrete design or implementation of a means for executing a step of a method according to the invention is obtained accordingly with one or more individual components, modules, or elements, each of which are implemented in the form of hardware, software, or a hardware/software combination. It is also clear to the person skilled in the art that numerous components or elements may, or must, interact with one another if they collectively form a means for executing a method step according to the invention, wherein it is then necessary to provide interfaces that are suitable for implementing the communication between the individual components, which can likewise be implemented by means of hardware, software, or as a hardware/software combination.

The invention claimed is:

1. A method for encrypted communication between a client and a server, wherein the encrypted communication comprises a first and second query message, each of which contains multiple query elements, and a first and second response message, each of which contains multiple response elements, comprising:
   receiving the first query message from the client;
   breaking down the first query message into query elements;
   determining, for at least one query element in the first query message, whether the at least one query element should be encrypted based on a predetermined configuration;
   determining, for each of the query elements that is to be encrypted based on the predetermined configuration, a key data, the key data configured for encryption and for decryption of each of the query elements;
   updating and storing the key data in a key manifest, wherein the key data comprises multiple encryption keys for a given query element, each encryption key having a limited validity before an expiration, and wherein the key manifest comprises information of encryption level performed on each of the query elements based on the key data for encryption;
   forming, based on the key data, an encrypted query element;
   composing the second query message from the query elements of the first query message by replacing at least one of the query elements with the encrypted query element;
   sending the second query message to the server;
   receiving the first response message from the server;
   breaking down the first response message into the multiple response elements;
   determining, whether to decrypt each response element of the first response message, based on the predetermined configuration;
   determining the key data for decryption of said each response element that must be decrypted from the key manifest;
   composing the second response message from the multiple response elements of the first response message, wherein said each response element that must be decrypted in the composed second response message is replaced by a corresponding decrypted response element; and sending the second response message to the client.

2. The method according to claim 1, wherein the predetermined configuration only encrypts those query elements of the first query message that do not affect functionality of the query elements on the server.

3. The method according to claim 1, wherein the key data comprises information regarding a type of encryption, an encryption algorithm, and a key name or key name pattern.

4. The method according to claim 1, wherein the determining the key data for encryption and decryption for the query element furthur depends on the respective query element of the first query message.

5. The method according to claim 1, wherein the encrypted communication between the client and the server follows a Representational State Transfer scheme, and each query message and response message are assigned to a resource.

6. The method according to claim 5, wherein the key data and corresponding decryption data are different for different resources, and a corresponding key manifest is administrated for each resource.

7. The method according to claim 6, wherein the key manifest is generated when a new resource is created in response to the query message.

8. A device for encrypted communication between a client and a server, wherein the device is disposed between the client and the server, wherein the encrypted communication comprises a first query message and a second query message, each of which contains multiple query elements, a first response message and a second response message, each of which contains multiple response elements, comprising:
   computer programming code; and
   a computer configured to execute the computer programming code to:
   receive the first query message from the client;
   break down the first query message into query elements;
   determine, for at least one query element of the first query message, whether the at least one query element should be encrypted based on a predetermined configuration;
   determine, for each of the query elements that is to be encrypted based on the predetermined configuration, a key data, the key data configured for encryption and for decryption of each of query elements;
   update and store the key data in a key manifest, wherein the key data comprises multiple encryption keys for a given query element, each encryption key having a limited validity before an expiration, and wherein the key manifest comprises information of encryption level performed on each of the query elements based on the key data for encryption;
   form, based on the key data, an encrypted query element;
   compose the second query message from the query elements of the first query message, and replace at least one of the query elements in the composed second query message with the encrypted query element;
   send the second query message to the server;
   receive the first response message from the server;
   break down the first response message into the multiple response elements;
   determine, for each response element of the first response message, whether said each response element needs to be decrypted based on the predetermined configuration;
   determine the key data for decryption for said each response element that must be decrypted from the key manifest,
   compose the second response message from the multiple response elements of the first response message;
   replace said each response element that must be decrypted in the composed second response message by a corresponding decrypted response element; and
   sending the second response message to the client.

9. The device for encrypting communication according to claim 8, wherein the device is configured as a proxy, wherein all communication between the client and the server takes place via the proxy, and wherein the proxy is connected to the client in a secure network.

10. A non-transitory, computer readable medium storing instructions which, when executed by a computer, cause the computer to perform a method, comprising:
   receiving a first query message from a client;
   breaking down the first query message into query elements;
   determining, for at least one query element in the first query message, whether the at least one query element should be encrypted based on a predetermined configuration;
   determining, for each of the query elements that is to be encrypted based on the predetermined configuration, a key data, the key data configured for encrpytion and for decryption of each of the query elements;
   updating and storing the key data in a key manifest, wherein the key data comprises multiple encryption keys for a given query element, each encryption key having a limited validity before an expiration, and wherein the key manifest comprises information for encryption level performed on each of the query elements based on the key data for encryption;
   forming, based on the key data, an encrypted query element;
   composing a second query message from the query elements of the first query message by replacing at least one of the query elements with the encrypted query element;
   sending the second query message to a server;
   receiving a first response message from the server;
   breaking down the first response message into multiple response elements;
   determining, whether to decrypt each response element of the first response message, based on the predetermined configuration;
   determining the key data for decryption of said each response element that must be decrypted from the key manifest;
   composing a second response message from the multiple response elements of the first response message, wherein said each response element that must be decrypted in the composed second response message is replaced by a corresponding decrypted response element; and
   sending the second response message to the client.

11. The device for encrypting communication between a client and a server, according to claim 8, wherein the predetermined configuration only encrypts the query element of the first query message that do not affect a functionality of the query element on the server.

12. The device for encrypting communication between a client and a server, according to claim 8, wherein the key data comprises information regarding a type of encryption, an encryption algorithm, and a key name or key name pattern.

13. The device for encrypting communication between a client and a server, according to claim 8, wherein the computer executes the computer programming code to determine a key data for encryption and for decryption is based on the respective query element of a query message.

14. The device for encrypting communication between a client and a server, according to claim 8, wherein the communication between the client and the server follows a Representational State Transfer scheme, and each query message and response message are assigned to a resource.

15. The device for encrypting communication between a client and a server, according to claim 14, wherein the key data and corresponding decryption data are different for different resources, and a corresponding key manifest is administrated for each resource.

16. The device for encrypting communication between a client and a server, according to claim 15, wherein the key manifest is generated when a new resource is created in response to the query message.

\* \* \* \* \*